United States Patent Office 3,325,491
Patented June 13, 1967

3,325,491
HYDROGENATION OF AMINOVINYL KETONES
James C. Martin, Kingsport, Tenn., assignor to Eastman Kodak Company, Rochester, N.Y., a corporation of New Jersey
No Drawing. Filed Jan. 6, 1965, Ser. No. 423,844
10 Claims. (Cl. 260—247.7)

This invention relates to a novel method for producing certain amino alcohols by the hydrogenation of aminovinyl ketones.

N. K. Kochetkov in Izvest. Akad. Nauk S.S.S.R. Otdel Khim. Nauk., 1954, 47–55 [C.A. 49, 6091 (1955)] reports that aminovinyl ketones when subjected to catalytic hydrogenation undergo hydrogenolysis to a ketone and an amine, e.g.,

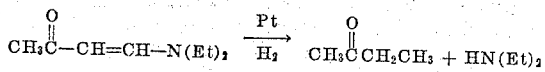

Contrary to the above report I have discovered that by the use of certain catalysts, namely, ruthenium or rhodium, the aminovinyl ketones can be hydrogenated to amino alcohols with excellent results. The method is illustrated by the following equation:

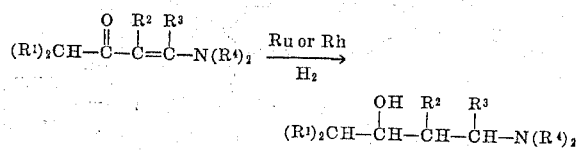

wherein $R^1$, $R^2$ $R^3$ and $R^4$ can be hydrogen or various organic substituents.

The aminovinyl ketones are a known class of compounds that have been disclosed for example by Benary, Ber. 63, 1573 (1930) and more recently by Terent'ev et al., J. Gen. Chem. (U.S.S.R.), 30, 2402 (1960) (English translation). A new method of making tertiary aminovinyl ketones by the reaction of an enamine with a ketene is disclosed in my U.S. Patent No. 3,141,880, issued July 21, 1964, another new method is disclosed in my copending U.S. patent application Ser. No. 335,348, filed Jan. 2, 1964, now Patent No. 3,285,915, issued Nov. 15, 1966, and a method of converting the tertiary aminovinyl ketones to aminovinyl ketones having other amino substituents is disclosed in my copending patent application Ser. No. 423,854, filed January 6, 1965, herewith, entitled, "Aminovinyl Ketones," now abandoned.

The method of the present invention can be used in general for hydrogenation of all aminovinyl ketones or so-called vinylog amides and the above cited references illustrate the large class of compounds for which the new method is applicable.

Typically, the substituents of the aminovinyl ketones for use in the method of the invention are as follows: $R^1$, $R^2$ and $R^3$, taken singly, are hydrogen or monovalent organic radicals such as alkyl radicals of up to about 18 carbon atoms, preferably lower alkyl; phenyl radicals; thienyl radicals; allyl radicals; and carbalkoxy radicals of which the alkoxy moiety has up to about 8 carbon atoms. The alkyl radicals can include various aralkyl radicals and the phenyl radicals can include alkaryl radicals, e.g., xylyl, o-, m- or p-tolyl, benzyl, o-, m- or p-cumenyl and the like. In addition, the substituents $R^1$, taken collectively with the carbon atom to which they are attached can form a carbocyclic or heterocyclic ring of 5 to 7 ring members such as cyclopentane, cyclohexane, norbornane, norbornene, pyran and related rings. The substituents $R^4$, taken singly, typically are hydrogen, akyl radicals of up to about 8 carbon atoms, including aralkyl and alkyl cyano radicals, and aryl radicals, including alkaryl, of up to about 8 carbon atoms. Taken collectively with the nitrogen atom, the substituents $R^4$ form a heterocyclic ring such as piperidino, morpholino, thiamorpholino, pyrrolidino and 3-azabicyclo [3.2.2] nonane-imino.

Examples of suitable aminovinyl ketones include the following:

2-ethyl-4-methyl-1-piperidino-1-penten-3-one,
2-ethyl-1-piperidino-1-buten-3-one,
1-morpholino-2-pentyl-1-buten-3-one,
1-dimethylamino-4-methyl-1-penten-3-one,
4-methyl-1-piperidino-1-penten-3-one,
4-methyl-1-morpholino-1-penten-3-one,
4-methyl-1-thiamorpholino-1-hexen-3-one,
2-ethyl-4-methyl-1-piperidino-1-hexen-3-one,
2,4-diethyl-1-piperidino-1-hexen-3-one,
2,4-diethyl-1-piperidino-1-octen-3-one,
2-ethyl-4,4-diphenyl-1-piperidino-1-buten-3-one,
2,4-dimethyl-1-piperidino-1-penten-3-one,
2-ethyl-4-methyl-1-pyrrolidinyl-1-penten-3-one,
2-ethyl-4-methyl-1-dimethylamino-1-penten-3-one,
2-ethyl-4-methyl-1-dibutylamino-1-penten-3-one,
1-(N-iminodipropionitrile)-4-methyl-1-penten-3-one,
1-(dibenzylamino)-4-methyl-1-penten-3-one,
1-(N-methylanilino)-4-methyl-1-penten-3-one,
3-cyclohexyl-1-piperidino-1-propen-3-one,
1-(3-azabicyclo[3.2.2]nonan-3-yl)-4-methyl-1-penten-3-one,
4-ethyl-1-piperidino-1-hexen-3-one,
1-dimethylamino-4-ethyl-1-hexen-3-one,
1-dodecylamino-4-methyl-1-penten-3-one
1-(p-methoxyanilino)-4-methyl-1-penten-3-one,
1-(n-dodecylamino)-4-methyl-1-penten-3-one,
1-(n-butylamino)-4-methyl-1-penten-3-one,
1-anilino-4-methyl-1-penten-3-one,
1-(N-methylanilino)-4-methyl-1-penten-3-one,
1-(2,5-dimethoxyanilino)-4-methyl-1-penten-3-one,
1-(2-pyridylamino)-4-methyl-1-penten-3-one,
1-(3-azabicyclo[3.2.2]nonan-3-yl)-2-ethyl-4-methyl-1-penten-3-one, and the like.

Further examples, of suitable aminovinyl ketones are disclosed in references such as Berchtold et al., J. Org. Chem., 26, 4776 (1961); Hasek et al., J. Org. Chem., 26, 4775 (1961); Opitz et al., Angew. Chem. Internat. edit., 1, 51 (1962); and in a series of papers by Russian chemists, including N. K. Kochetkov, abstracts of which appear in Chemical Abstracts as follows: C. A. 49, 2308 and 6091 (1955); C. A. 50, 13919i (1955); C. A. 51, 1830a (1956); C. A. 52, 15427f (1957); C. A. 52, 3675e (1957); and C. A. 53, 92076b (1958).

The critical element of my novel process is the catalyst. I have discovered unexpectedly that ruthenium and rhodium catalyze the hydrogenation of the aminovinyl ketone to an amino alcohol while other hydrogenation catalysts do not. For example, Kochetkov, above, tried hydrogenation over platinum oxide and obtained only low boiling products. I have found that palladium catalysts give similar results. Nickel catalysts have proven to be relatively inactive and also give low boilers.

In accordance with my invention, the ruthenium and rhodium can be used as the metal oxides or as the metals supported on a carrier or support, and in referring to the ruthenium and rhodium catalysts I mean to include the metals and the oxides. Suitable supports include, for example, alumina, carbon, kieselguhr, silica gel and the like. In such supported catalysts the concentration of the ruthenium or rhodium metal can vary considerably, e.g., from about 0.1 to 50 percent of the total catalyst weight. The catalyst can be in powdered form, for example, when the reaction is carried out in a shaking or stirred reaction vessel, or in pelleted or granular form, for example, when employing a tubular reactor with continuous flow of the reactant stream. The amount of catalyst relative to the feed stock can also vary considerably, e.g., from 0.1 to 50 weight percent of the amount of aminovinyl ketone feed.

The reaction is normally carried out in standard hydrogenation equipment such as a high pressure rocking or stirred autoclave, in a low pressure batch reactor, or in a continuous tubular reactor through which the feed stream is pumped under hydrogenation conditions.

The hydrogenation can be accomplished over a wide temperature and pressure range, e.g., 0 to 250° C. and pressures from one to several hundred atmospheres. Generally, the rate of hydrogenation is greater at higher pressures. Preferred conditions include temperatures in the range of about 25 to 150° C. and pressures in the range of about 10 to about 250 atmospheres.

The novel hydrogenation reaction proceeds with undiluted aminovinyl ketone. However, I prefer to use a solvent for easier handling and better heat control. Suitable solvents include liquids that dissolve the aminovinyl ketones but do not react with them and are not reduced during the hydrogenation reaction. Examples of suitable solvents include: water, alcohols, esters, ethers, aliphatic and aromatic hydrocarbons, and dipolar aprotic solvents, e.g., ethanol, isobutanol, isobutyl isobutyrate, ethyl acetate, ethylbutyl ether, n-hexane, n-heptane, benzene, toluene, dimethylformamide, dimethylacetamide, ethylene carbonate, propylene carbonate and the like. I have found that water, in addition to its advantage of low cost, appears to increase the activity of ruthenium catalysts. It is therefore particularly advantageous as a solvent in my process.

The process of the invention is further illustrated by the following examples:

*Example 1*

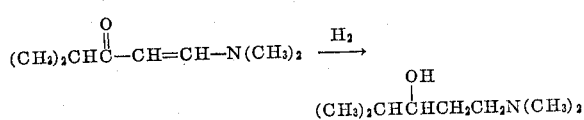

A solution of 100 g. of 1-dimethylamino-4-methyl-1-penten-3-one in 400 ml. of cyclohexane was hydrogenated in a stainless steel, rocking autoclave over 25 g. of 5% ruthenium on powdered carbon for 2 hr. at 60° and 1500 p.s.i. The catalyst was removed by filtration and the filtrate was distilled through a 12-in. packed column to give 75.2 g. of 1-dimethylamino-4-methyl-3-pentanol, B.P. 104° (50 mm.), $n_D^{20}$ 1.4331.

*Analysis.*—Calcd. for $C_8H_{19}NO$: C, 66.2; H, 13.1; N, 9.7. Found: C, 66.4; H, 13.6; N, 9.4. The n.m.r. spectrum was in agreement with this structure.

*Example 2*

A solution of 50 g. of 1-dimethylamino-4-methyl-1-penten-3-one in 200 ml. of water was hydrogenated in a stainless steel, rocking autoclave over 2 g. of 5% ruthenium on powdered carbon for 2 hr. at 70° and 1500 p.s.i. The catalyst was removed by filtration and the filtrate was extracted with ether. Distillation of the ether layer yielded 40.2 g. of 1-dimethylamino-4-methyl-3-pentanol.

*Example 3*

A solution of 50 g. of 1-dimethylamino-4-methyl-1-penten-3-one in 200 ml. of cyclohexane was hydrogenated in a stainless steel, rocking autoclave over 10 g. of 5% rhodium on alumina for 2 hr. at 80° and 1500 p.s.i. The catalyst was removed by filtration and the filtrate was distilled to yield 35.6 g. of 1-dimethylamino-4-methyl-3-pentanol.

*Example 4*

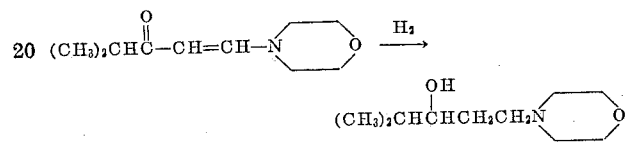

By the same method used in Example 2, hydrogenation of 50 g. of 4-methyl-1-morpholino-1-penten-3-one in 100 ml. of water over 3 g. of 5% ruthenium on carbon gave 38.4 g. of 4-methyl-1-morpholino-3-pentanol, B.P. 91–93° (10 mm.).

*Example 5*

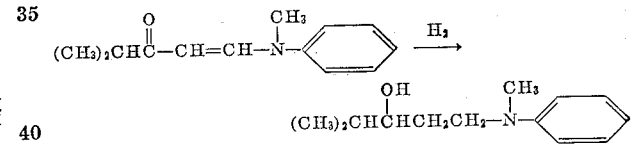

By the same method used in Example 1, hydrogenation of 20 g. of 4-methyl-1-(N-methylanilino)-1-penten-3-one in 100 ml. of cyclohexane over 3 g. of 5% ruthenium on carbon gave 12.3 g. of 4-methyl-1-(N-methylanilino)-3-pentanol, B.P. 102–103° (6 mm.).

*Example 6*

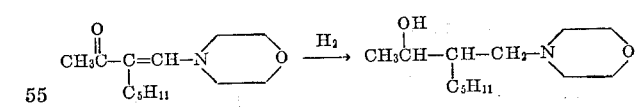

A solution of 25 g. of 1-morpholino-2-pentyl-1-buten-3-one in 150 ml. of ethyl alcohol was hydrogenated in a stainless steel, rocking autoclave over 1 g. of 5% ruthenium on alumina for 3 hr. at 120° and 1000 p.s.i. The catalyst was removed by filtration and the filtrate was distilled through a 6-in. Vigreux column to yield 20.3 g. of 1-morpholino-2-pentyl-3-butanol, B.P. 92–96° (4 mm.).

*Example 7*

A solution of 100 g. of 1-dimethylamino-4-methyl-1-penten-3-one in 300 ml. of butyl acetate is hydrogenated in a stirred, stainless steel autoclave over 1 g. of 5% ruthenium on powdered alumina at 150° and 3000 p.s.i. for 1 hr. The catalyst is removed by filtration and examination of the filtrate by vapor phase chromatography shows a high yield of 1-dimethylamino-4-methyl-3-pentanol.

Example 8

Under the general conditions of Example 1, the following aminovinyl ketones are reduced to the products shown, in accordance with the invention:

| Aminovinyl Ketone | Product |
|---|---|
| CH₃C(O)CH=CHN(CH₃)₂ | CH₃CH(OH)CH₂CH₂N(CH₃)₂ |
| (CH₃)₂CHC(O)CH=CHNH–C₆H₅ | (CH₃)₂CHCH(OH)CH₂CH₂NH–C₆H₅ |
| (CH₃)₂CHC(O)CH=CHN(piperazine)NCH=CHC(O)CH(CH₃)₂ | (CH₃)₂CH(OH)CH(CH₂)₂–N(piperazine)N–(CH₂)₂CH(OH)CH(CH₃)₂ |
| (CH₃)₂CHC(O)C(C₂H₅)=CHN(cycloalkyl) | (CH₃)₂CHCH(OH)CH(C₂H₅)CH₂–N(cycloalkyl) |
| (CH₃)₂CHC(O)CH=CHNH–C₆H₄–SO₂NH₂ | (CH₃)₂CHCH(OH)CH₂CH₂NH–C₆H₄–SO₂NH₂ |

Although the invention has been described in considerable detail with particular reference to certain preferred embodiments thereof, it will be understood that variations and modifications can be effected within the spirit and scope of the invention as defined in the appended claims.

I claim:

1. The method of preparing amino alcohols which comprises subjecting an aminovinyl ketone to catalytic hydrogenation in the presence of a catalyst selected from the group consisting of ruthenium and rhodium.

2. The method according to claim 10 which comprises subjecting to catalytic hydrogenation at 0 to 250° C. and 10 to 250 atmospheres in the presence of a catalyst selected from the group consisting of ruthenium and rhodium an aminovinyl ketone of the formula:

$$(R^1)_2CH-\underset{\underset{O}{\parallel}}{C}-\underset{\underset{R^2}{\mid}}{C}=\underset{\underset{R^3}{\mid}}{C}-N(R^4)_2$$

and recovering an amino alcohol of the formula:

$$(R^1)_2CH-\underset{\underset{OH}{\mid}}{CH}-\underset{\underset{R^2}{\mid}}{CH}-\underset{\underset{R^3}{\mid}}{CH}-N(R^4)_2$$

wherein $R^1$, $R^2$, $R^3$ and $R^4$, taken singly, are selected from the group consisting of hydrogen and lower alkyl and the substituents $R^1$, taken collectively with the carbon atom to which they are attached, form a carbocyclic ring of 5 to 7 carbon atoms, and the substituents $R^4$, taken collectively with the nitrogen atom, form a heterocyclic ring selected from the group consisting of piperidino, morpholino, thiamorpholino, pyrrolidino and 3-aza-bicyclo[3.2.2]nonaneimino.

3. The method according to claim 2 in which the catalyst is ruthenium and the hydrogenation is carried out in the presence of water.

4. The method of preparing 1-dimethylamino-4-methyl-3-pentanol which comprises hydrogenating 1-dimethylamino-4-methyl-1-penten-3-one in the presence of a supported ruthenium catalyst.

5. The method according to claim 4 in which said 1-dimethylamino-4-methyl-1-penten-3-one is in water solution.

6. The method of preparing 1-dimethylamino-4-methyl-3-pentanol which comprises hydrogenating 1-dimethylamino-4-methyl-1-penten-3-one in the presence of a supported rhodium catalyst.

7. The method of preparing 4-methyl-1-morpholino-3-pentanol which comprises hydrogenating 4-methyl-1-morpholino-1-penten-3-one in the presence of a supported ruthenium catalyst.

8. The method of preparing 4-methyl-1-(N-methylanilino)-3-pentanol which comprises hydrogenating 4-methyl-1-(N-methylanilino)-1-penten-3-one in the presence of a supported ruthenium catalyst.

9. The method of preparing 1-morpholino-2-pentyl-3-butanol which comprises hydrogenating 1-morpholino-2-pentyl-1-buten-3-one in the presence of a supported ruthenium catalyst.

10. The method according to claim 1 wherein the aminovinyl ketone has the formula:

$$(R^1)_2CH-\underset{\underset{O}{\parallel}}{C}-\underset{\underset{R^2}{\mid}}{C}=\underset{\underset{R^3}{\mid}}{C}-N(R^4)_2$$

and recovering an amino alcohol of the formula:

$$(R^1)_2CH-\underset{\underset{OH}{\mid}}{CH}-\underset{\underset{R^2}{\mid}}{CH}-\underset{\underset{R^3}{\mid}}{CH}-N(R^4)_2$$

wherein $R^1$, $R^2$ and $R^3$, taken singly, are selected from the group consisting of hydrogen, alkyl radicals of up to about 18 carbon atoms, phenyl radicals, thienyl radicals, allyl radicals, and carbalkoxy radicals of which the alkoxy moiety has up to about 8 carbon atoms, the substituents $R^1$, taken collectively with the carbon atom to which they are attached, form a ring selected from the group consisting of carbocyclic and heterocyclic rings of 5 to 7 ring members, and the substituents $R^4$, taken singly, are selected from the group consisting of hydrogen and alkyl and aryl radicals of up to about 8 carbon atoms and, taken collectively with the nitrogen atom, represent a heterocyclic ring selected from the group consisting of piperidino, morpholino, thiamorpholino, pyrrolidino, and 3-azabicyclo[3.2.2]nonaneimino.

References Cited

FOREIGN PATENTS 916,119   1/1963   Great Britain.

OTHER REFERENCES

Breitner et al.: J. Organic Chemistry, vol. 24, pp. 1855–57 (1959).

ALEX MAZEL, *Primary Examiner.*

J. TOVAR, *Assistant Examiner.*